(12) United States Patent
Bullerjahn et al.

(10) Patent No.: US 9,718,731 B2
(45) Date of Patent: Aug. 1, 2017

(54) METHOD FOR PRODUCING MAGNESIUM SILICATE-BELITE-CALCIUM ALUMINATE CEMENT

(71) Applicant: HEIDELBERGCEMENT AG, Heidelberg (DE)

(72) Inventors: Frank Bullerjahn, Leimen (DE); Mohsen Ben Haha, Heidelberg (DE); Nicolas Spencer, Malsch (DE); Anca Itul, Heidelberg (DE); Dirk Schmitt, Leimen (DE)

(73) Assignee: HEIDELBERGCEMENT AG, Heidelberg (DE)

( * ) Notice: Subject to any disclaimer, the term of this patent is extended or adjusted under 35 U.S.C. 154(b) by 0 days.

(21) Appl. No.: 14/787,024

(22) PCT Filed: May 7, 2014

(86) PCT No.: PCT/EP2014/001214
§ 371 (c)(1),
(2) Date: Oct. 26, 2015

(87) PCT Pub. No.: WO2014/183844
PCT Pub. Date: Nov. 20, 2014

(65) Prior Publication Data
US 2016/0102021 A1    Apr. 14, 2016

(30) Foreign Application Priority Data

May 11, 2013 (EP) .................................... 13002496
Nov. 11, 2013 (EP) .................................... 13005291
Nov. 28, 2013 (EP) .................................... 13005528

(51) Int. Cl.
| | | |
|---|---|---|
| C04B 7/345 | (2006.01) | |
| C04B 22/00 | (2006.01) | |
| C04B 28/04 | (2006.01) | |
| C04B 40/00 | (2006.01) | |
| C04B 7/14 | (2006.01) | |
| C04B 7/26 | (2006.01) | |
| C04B 7/43 | (2006.01) | |
| C04B 28/08 | (2006.01) | |
| C04B 103/12 | (2006.01) | |
| C04B 103/14 | (2006.01) | |

(52) U.S. Cl.
CPC ............ *C04B 22/0093* (2013.01); *C04B 7/14* (2013.01); *C04B 7/26* (2013.01); *C04B 7/345* (2013.01); *C04B 7/43* (2013.01); *C04B 28/04* (2013.01); *C04B 28/08* (2013.01); *C04B 40/0028* (2013.01); *C04B 2103/12* (2013.01); *C04B 2103/14* (2013.01); *Y02P 40/148* (2015.11)

(58) Field of Classification Search
CPC .. C04B 7/345; C04B 7/26; C04B 7/14; C04B 7/43; C04B 14/043; C04B 22/0093; C04B 28/04; C04B 28/08; C04B 40/0028; C04B 2103/12; C04B 2103/14
See application file for complete search history.

(56) References Cited

U.S. PATENT DOCUMENTS

| | | |
|---|---|---|
| 5,509,962 A | 4/1996 | Tang |
| 8,226,763 B2 | 7/2012 | Beuchle et al. |
| 8,226,764 B2 | 7/2012 | Beuchle et al. |
| 8,382,892 B2 | 2/2013 | Beuchle et al. |
| 2016/0107933 A1* | 4/2016 | Schmitt .................. C04B 28/04 106/709 |

FOREIGN PATENT DOCUMENTS

| | | |
|---|---|---|
| DE | 138 197 A1 | 10/1979 |
| DE | 34 14 196 A1 | 10/1985 |
| DE | 10 2005 037 771 A1 | 2/2007 |
| DE | 10 2005 037 771 B4 | 8/2007 |
| DE | 10 2007 035 257 B3 | 11/2008 |
| DE | 10 2007 035 258 B3 | 11/2008 |
| DE | 10 2007 035 259 B3 | 11/2008 |
| DE | 10 2009 018 632 A1 | 9/2011 |
| DE | 10 2009 018 632 B4 | 11/2011 |
| EP | 1 719 741 A1 | 11/2006 |
| EP | 2 243 754 A1 | 10/2010 |
| EP | 2 676 943 A1 | 12/2013 |
| WO | WO 2007/017142 A2 | 2/2007 |
| WO | WO 2009/015769 A1 | 2/2009 |
| WO | WO 2009/015770 A1 | 2/2009 |
| WO | WO 2009/015771 A1 | 2/2009 |

OTHER PUBLICATIONS

International Search Report, PCT/EP2014/001214, Jun. 18, 2014, 2 pgs.
Ishida et al., "A-Dicalcium Silicate Hydrate: Preparation, Decomposed Phase, and Its Hydration", J. Am. Ceram. Soc., vol. 76, No. 7 (1993), pp. 1707-1712.
Jiang et al., "Hydrothermal Processing of New Fly Ash Cement", Ceramic Bulletin, vol. 71, No. 4 (1992), pp. 642-647.

(Continued)

*Primary Examiner* — Anthony J Green
(74) *Attorney, Agent, or Firm* — Paul D. Strain, Esq.; Strain & Strain PLLC

(57) ABSTRACT

The present invention relates to a method for producing a binder comprising the following steps:
  a) providing a starting material, from raw materials, that has a molar (Ca+Mg)/(Si+Al+Fe) ratio from 1 to 3.5, a molar ratio Ca/Mg from 0.1 to 100, and a molar Al/Si ratio from 100 to 0.1, wherein constituents that are inert during the hydrothermal treatment in an autoclave are not taken into account for determination of the ratios,
  b) mixing the raw materials,
  c) hydrothermal treating of the starting material mixture produced in step b) in an autoclave at a temperature from 100 to 300° C. and a residence time from 0.1 to 24 h, wherein the water/solids ratio is 0.1 to 100,
  d) tempering the intermediate product obtained in step c) at 350 to 600° C., wherein the heating rate is 10-6000° C./min and the residence time is 0.01-600 min.

29 Claims, 2 Drawing Sheets

(56) References Cited

OTHER PUBLICATIONS

Pimraksa et al., "Synthesis of belite cement from lignite fly ash", Ceram. Int., vol. 35 (2009), pp. 2415-2425.
EPO Opposition, Appl. No. EP13002496.1, Jun. 16, 2016, 7 pgs.
Kim et al., "Influence of Minor Ions on the Stability and Hydration Rates of β-Dicalcium Silicate", J. Am. Ceram. Soc., vol. 87, No. 5 (2004), pp. 900-905.
Jernejcic et al., "Thermal decomposition of α-dicalcium silicate hydrate", Thermochimica Acta, vol. 20 (1977), pp. 237-247.
Miyazaki et al., "Crystallographic Data of a New Phase of Dicalcium Silicate", J. Am. Ceram. Soc., vol. 81, No. 5 (1998), pp. 1339-1343.
Toraya et al., "Simulated annealing structure solution of a new phase of dicalcium silicate $Ca_2SiO_4$ and the mechanism of structural changes from α-dicalcium silicate hydrate to $α_L$'-dicalcium silicate via the new phase", Acta Cryst., vol. B58 (2002), pp. 613-621.
Hjorth et al., "Belite in Portland Cement", Cement and Concrete Research, vol. 1 (1971), pp. 27-40.
Garbev et al., "First Observation of α-Ca2[SiO3(OH)](OH)-Ca6[Si2O7][SiO4](OH)2 Phase Transformation upon Thermal Treatment in Air", Journal of the American Ceramic Society, vol. 91, No. 1 (2008), pp. 263-271.
Barnes et al., "Composition of Portland Cement Belites", Cement and Concrete Research, vol. 8 (1978), pp. 559-564.
Ishida et al., "Innovative Processing for Cement Materials", MRS Bulletin (Nov. 2001), pp. 895-898.
Gosh, "Hydration of polymorphs of dicalcium silicate", il cement, vol. 3 (1985), pp. 139-146.

\* cited by examiner

METHOD FOR PRODUCING MAGNESIUM SILICATE-BELITE-CALCIUM ALUMINATE CEMENT

CROSS-REFERENCE TO RELATED PATENT APPLICATIONS

This application is a National Stage of International Application No. PCT/EP2014/001214, filed May 7, 2014, which is based upon and claims the benefit of priority from prior European Patent Applications No. 13002496.1, filed May 11, 2013, No. 13005291.3, filed Nov. 11, 2013, and No. 13005528.8, Nov. 28, 2013, the entire contents of all of which are incorporated herein by reference in their entirety.

The present invention relates to a method for producing a binder for building materials such as concrete, mortar or plaster, and to a binder produced in accordance with this method, and to the use of said binder.

Cement as a hydraulic binder is an important industrial product, which consists of Portland cement clinker in significant proportions. This clinker is produced by sintering a mixture of lime, sand, clay and correcting materials at approximately 1450° C. After the high-temperature reaction, the following foreign oxide-containing phases are present: alite ($Ca_3SiO_5$, is also referred to as $C_3S$), belite ($Ca_2SiO_4$, is also referred to as $C_2S$), aluminate ($Ca_3Al_2O_6$, is also referred to as $C_3A$) and ferrite ($Ca_2(Al_xFe_{1-x})_2O_5$, is also referred to as $C_4AF$). Here, belite is present primarily in the form of the β polymorph. This phase is deemed relatively inert with a low contribution to strength in the early stage.

The hydraulic reactivity describes the reaction of a binder with water to form a solid material. In contrast to alite hydration, belite hydration occurs slowly over a number of months and years.

It is known that the reactivity of belite with water can be improved by mechanochemical activation (DD 138197 A1), rapid cooling after the burning process (DD 138197 A1 and DE 3414196 A1) and the incorporation of foreign oxides (U.S. Pat. No. 5,509,962 A and DE 3414196 A1). In addition, besides the β variant of belite, other polymorphs are known, which have an improved (α, α'H, α'L and x) or worse reactivity (γ).

A method for producing α-dicalcium silicate hydrate (α-$C_2SH$) at 200° C. by means of a two-hour hydrothermal treatment of burned lime (CaO) and silicic acid for laboratory syntheses (purity grade p.a.) is known from H. Ishida, S. Yamazaki, K. Sasaki, Y. Okada, T. Mitsuda, [alpha]-Dicalcium Silicate Hydrate: Preparation, Decomposed Phase, and Its Hydration, J. Am. Ceram. Soc. 76, p. 1707-1712, 1993. In the temperature range of 390-490° C., α-$C_2SH$ converts into various $C_2S$ modifications, which transition with further heating to 920-960° C. into the α'L phase and form β-$C_2S$ during cooling. A disadvantage here is the high proportion of inert γ-$C_2S$.

A method for producing a belite-containing binder is disclosed in DE 10 2009 018 632, in which an intermediate product that was produced at 120-250° C. by hydrothermal treatment of the starting material with a molar ratio Ca/(Si+Al) between 1.5 and 2.5 is subjected to reaction grinding at 100-200° C. between 5 min and 30 min. A disadvantage is that reaction grinding is an inefficient step in terms of energy. Furthermore, a sufficient compression strength after the hardening can only be achieved with addition of superplasticisers.

DE 10 2005 037 771 discloses a method for producing belite cement, in which α-dicalcium silicate hydrate (α-$C_2SH$) is produced at 100-300° C. by a hydrothermal treatment of the starting material, which contains CaO and $SiO_2$ in the molar Ca/Si ratio 1.5-2.5. In the temperature range between 500 and 1000° C., α-$C_2SH$ is converted into hydraulic reactive $C_2S$ modifications (belite cement). A disadvantage here is that the burning process has to be performed at comparatively high temperature (above 500° C.). These high temperatures furthermore lead to a reduction of the reactivity of the binder.

Jiang et al., "Hydrothermal Processing of New Fly Ash Cement", Ceramic Bulletin, 71, 1992, pages 642 to 647 describe a conversion of fly ash and CaO to $C_2S$ and $C_{12}A_7$ by hydrothermal treatment (4 h at 200° C.) and calcining at 500 to 900° C. The high temperature during calcining has a negative effect on the reactivity of the product. In addition, a pre-treatment lasting ten hours at 80° C. is necessary.

Document EP 12004620.6, which is not pre-published, describes a method for producing a binder comprising the following steps:

a) providing a starting material, from raw materials, that has a molar Ca/Si ratio from 1.5 to 2.5, with disregard during the establishment of the starting material for those constituents that are inert during a hydrothermal treatment in an autoclave, b) mixing the raw materials, c) hydrothermal treating of the starting material mixture produced in step b) in an autoclave at a temperature from 100 to 300° C. and a residence time from 0.1 to 24 h, wherein the water/solids ratio is 0.1 to 100, d) tempering the intermediate product obtained in step c) at 350 to 495° C., with a heating rate of 10-6000° C./min and a residence time of 0.01-600 min, wherein 0.1 to 30% by weight of additional elements and/or oxides are added during the mixing and/or in the following steps.

Pimraksa et al., "Synthesis of belite cement from lignite fly ash", Ceram. Int. 35 (2009) 2415-2425 demonstrate that fly ash is suitable as a starting product for the production of belite cement by hydrothermal treatment and calcining. The hydrothermal treatment takes place at 130° C., preferably in the presence of NaOH for the creation of alkaline conditions. The products of the hydrothermal treatment are then calcined at 750 to 950° C. for 30 minutes, wherein the heating rate is 8° C./min up to 600° C., and 4° C./min thereabove. $C_2S$ (β and α) and $C_{12}A_7$ are specified as the product.

Most of these proposals are based on high-grade raw materials. In addition a calcining process, still at very high temperatures, and/or an activation of the raw materials/intermediate products by energy-intensive reaction grinding is/are predominantly necessary.

The object was therefore to propose a method for producing binders by means of which a high reactivity of the binder can be attained in order to thus produce efficient cements. Here, a much lower carbon dioxide emission than with conventional Portland cements with high alite content should also be achieved. In addition, conservation of high-grade natural raw materials is sought, that is to say these are to be replaceable at least in part, preferably largely even fully, by secondary raw materials.

It has now surprisingly been found that raw materials also containing Mg and Al and optionally Fe in addition to Ca and Si produce very reactive binders by hydrothermal treatment and subsequent tempering at 350 to at most 600° C., ideally at less than 500° C.

The object is therefore solved by a method for producing a binder, comprising the following steps:

a) providing a starting material from raw materials that contain CaO, MgO, $SiO_2$, $Al_2O_3$ and $Fe_2O_3$ or other compounds of these elements and have a molar (Ca+Mg)/

(Si+Al+Fe) ratio from 1 to 3.5, a molar ratio Ca:Mg from 0.1 to 100 and a molar ratio (Al+Fe)/Si from 100 to 0.1, wherein constituents that are inert during the hydrothermal treatment in an autoclave are not taken into account for determination of the ratios, b) mixing the raw materials, c) hydrothermal treating of the starting material mixture produced in step b) in an autoclave at a temperature from 100 to 300° C. and a residence time from 0.1 to 24 h, wherein the water/solids ratio is from 0.1 to 100, d) tempering the intermediate product obtained in step c) at 350 to 600° C., wherein the heating rate is from 10-6000° C./min and the residence time is from 0.01-600 min.

Preferably, 0.1 to 30% by weight additional elements and/or oxides can be added during the mixing b) and/or in the following steps.

In accordance with the method according to the invention, the molar ratio of the sum of calcium and magnesium to the sum of silicon, aluminium and iron should be from 1.0 to 3.5, preferably from 1.5 to 2.5, particularly preferably approximately 2. The ratio of calcium to magnesium is from 0.1 to 100, preferably from 0.2 to 20, preferably from 0.5 to 5. The ratio of the sum of aluminium and iron to silicon is from 0.01 to 100. For a high aluminium content a ratio of the sum of aluminium and iron to silicon from 100 to 10 is preferred, for a medium aluminium content from 1 to 20, and for a low aluminium content from 0.01 to 2. Compounds that are inert during the production method are not taken into account for determination of the ratios.

Primary and/or secondary raw materials can be used as starting material. In a preferred embodiment, quartzes, sands or gravels, old concrete and fly ash are used as raw materials for the starting material. The desired (Ca+Mg)/(Si+Al+Fe) ratio, Ca/Mg ratio and/or Al/Si ratio may already be present depending on the raw material, if not, the materials have to be adjusted in terms of the chemical composition by addition of further reaction partners before the further treatment, such as Ca-, Mg-, Al-, Fe- or Si-containing solid materials in order to adjust the necessary (Ca+Mg):(Si+Al+Fe) ratio from 1 to 3.5, the desired Ca:Mg ratio from 0.1 to 100, and/or the desired Al+Fe:Si ratio from 100 to 0.1. For increasing the Ca content e.g., but not exclusively, Portlandite $Ca(OH)_2$ or burned lime, ashes with high chemical CaO and/or free lime content, cement clinker and granulated blast furnace slag are suitable. For increasing the Mg content, e. g. burned dolomite (burned >500° C.) is suitable. For increasing the Al content, aluminium-rich fly ashes, but also clays, for example calcined clays, bauxite, Al-containing waste materials and residuals are well suited.

As a rule, the raw materials are optimised with regard to particle size and particle size distribution. To this end mechanical or thermal treatments are useful, wherein thermal treatments can also improve/optimise the (chemical) mineralogical composition. Examples for treatments are the burning of carbon (e.g. in ashes) or conversion of non reactive phases to reactive compounds, like $SiO_2$ or $C_2AS$ into $C_2S$, which in turn can improve conversion within the autoclave.

In a preferred embodiment a starting material is chosen or provided by pre-treatment that has a maximum grain size of 0.1 mm or below. For this especially the finer grain fractions from recycling cementitious binders in building materials such as used concretes and used cement are applied. A finer starting material is beneficial with regard to conversion rate as well as with regard to grinding effort for the finished cement. With a sufficiently fine starting material a grinding after the hydrothermal treatment and tempering can be superfluous. A grinding of the obtained cement is in most cases unnecessary or limited to the attainment of conventional cement finenesses. An "activating" intensive grinding is not necessary and preferably does not take place.

Preferably, further elements or oxides in an amount of 0.1 to 30% by weight are added while mixing the raw materials b) or in the subsequent process steps. Sodium, potassium, boron, sulphur, phosphorous or a combination thereof are preferred as these further elements/oxides, which together are also preferably designated foreign oxides. Useful are alkaline and/or earth alkaline salts and/or hydroxides, for example, but not exclusively, $CaSO_4.2\,H_2O$, $CaSO_4.\frac{1}{2}\,H_2O$, $CaSO_4$, $CaHPO_2.2H_2O$, $Ca_3P_2O_8$, $NaOH$, $KOH$, $Na_2CO_3$, $NaHCO_3$, $K_2CO_3$, $MgCO_3$, $MgSO_4$, $Na_2Al_2O_4$, $Na_3PO_4$, $K_3PO_4$, $Na_2[B_4O_5(OH)_4].8H_2O$, $CaCl_2$, $Ca(NO_3)_2$, $MgCl_2$, $Mg(NO_3)_2$, $AlCl_3$, $Al(NO_3)_3$, $FeCl_3$, $Fe(NO_3)_3$ $Ca(CH_3COO)_2$, $Mg(CH_3COO)_2$, $Al(CH_3COO)_3$, $Ca(HCOO)_2$, $Mg(HCOO)_2$, $Al(HCOO)_3$ and mixtures of two, three or also more of them. In a preferred embodiment the starting material mixture has a molar ratio P/Si of about 0.05 and/or S/Si of about 0.05 and/or Ca/K of about 0.05.

The raw material mixture, optionally pre-treated as described, can optionally be mixed, i.e. seeded, with seed crystals, which for example contain calcium silicate hydrate, Portland clinker, granulated blast furnace slag, magnesium silicates, calcium sulphate aluminate (belite) cement, sodium silicate, glass powder and so on. Hereby, the reaction can be accelerated by seeding with from 0.01-30% by weight seed crystals, especially various calcium silicate and calcium silicate hydrate compounds, especially with α-$2CaO.SiO_2.H_2O$, afwillite, calciochondrodite, α- and β-$Ca_2SiO_4$ and other compounds.

The produced raw material mixture, which is optionally seeded as described above, is subsequently subjected in step c) to a hydrothermal treatment in an autoclave at a temperature from 100 to 300° C., preferably from 150° C. to 250° C. Hereby, a water/solids ratio from 0.1 to 100, preferably from 2 to 20, is preferably chosen. The residence times are preferably from 0.1 to 24 hours, preferably from 1 to 16 hours.

The raw material mixture can be burned in a prior additional step. This step is particularly preferred with the use of industrial by-products or relatively poorly reactive or coarse materials a raw materials. Here, temperatures from 350 to 1400° C., preferably from 750 to 1100° C., are suitable. The burning period is 0.1-6 hours, preferably approximately 1 hour. As a result of the burning of the raw materials, substances that would otherwise hardly be useful or that would be unusable can be made useful selectively (for example crystalline ashes, limestone, dolomite and slags, etc.). Here, the chemical composition of the raw meal can be optimised before clinker burning, and an improved/ greater degree of reaction in the autoclave is ensured. Furthermore, there is the advantage that selectively reactive phases (for example calcium and/or magnesium aluminates, calcium and/or magnesium silicates, calcium and/or magnesium ferrites and oxides) can be produced that have products after step c) and d) with particularly high contents of x-$C_2S$, α-$C_2S$, $C_{12}A_7$, Mg silicates, MgO and/or at least one reactive, X-ray amorphous phase and/or ill crystalline phase. An advantage of the use of belite as a raw material for the autoclave process is an improved phase composition of the final binder compared with unburned raw materials.

Kiln meal or hot meal can be used as at least one raw material component for the proposed clinker burning or preferably directly for the autoclaving step. The advantage lies in the fact that this material is already deacidified to a large extent, and, as a result, energy and also additional equipment can be saved. In addition, this enables a "system-in-system solution", since waste heat flows or amounts can be utilised purposefully for the autoclaving process and tempering process.

The starting material mixture produced by mixing and optionally burning the raw materials is converted in accordance with step c) into the intermediate product containing at least one calcium silicate hydrate or calcium aluminate hydrate or calcium aluminium silicate hydrate or magnesium silicate hydrate or calcium magnesium silicate hydrate or magnesium (aluminium, iron) silicate hydrate or magnesium (calcium, aluminium, iron) silicate and optionally further compounds by means of hydrothermal treatment. This occurs in an autoclave, at a temperature from 100 to 300° C. and a residence time from 0.1 to 24 h, wherein the water/solids ratio is from 0.1 to 100.

The intermediate product obtained in step c) contains at least one, usually several of the mentioned calcium and/or magnesium silicate or aluminate hydrates, typically:

0.01 to 80% by weight $\alpha$-$C_2SH$, differing C—S—H forms including dellaite and partially carbonated C—S—H phases as well as amorphous and ill crystalline phases thereof 0.01 to 80% by weight katoite, Si-katoite, Fe-katoite, also as mono- and semi-carbonate as well as amorphous and ill crystalline phases thereof 0.01 to 80% by weight magnesium (calcium, aluminium, iron) silicates or silicate hydrates as well as amorphous and ill crystalline phases thereof 0.01 to 80% by weight aluminium silicates and/or iron silicates and silicate hydrates as well as amorphous and ill crystalline phases thereof traces and minor components such as alumina/iron oxide and aluminium or iron hydroxides, $C_2AS$, CH, $MgCO_3$, $Mg(OH)_2$, quartz and calcite.

Generally, the amorphous and ill crystalline phases are a precursor of the crystalline phases, for example calcium silicates (belite), calcium aluminates (mono calcium aluminates, mayenite), magnesium (aluminium, iron) silicates (serpentinites, talc), and so on, which have no or only a low atomic (short-range) order. This is reflected in a lack of X-ray reflexes or the formation of very much broadened reflexes with low intensity. A good example for this is granulated blast furnace slag with high amorphous content (>95%). A very pronounced "glassy hill" over a 2theta range on which the main peak(s) of the crystalline phases, e.g. akermannite or gehlenite, is/are situated, depending on chemical composition, is typical. The degree of crystallinity depends on several parameters, for example the kind of starting material, the temperature, the pressure and the built-in foreign ions.

In the following step d) the intermediate product is tempered at a temperature from 350° C. to 600° C. Here, the heating rate is from 10-6000° C./min, preferably from 20-100° C./min, and particularly preferably approximately 40° C./min, and the residence time is from 0.01 to 600 min, preferably from 1-120 min, and particularly preferably from 5-60 min. An additional holding time during the heating at 400-440° C. from 1-120 min, preferably from 10-60 min, has proven to be expedient in order to lower the proportion of more inert $\gamma$-$C_2S$. There is no reaction grinding. The temperature is preferably 400 to 550° C., in particular 400 to 495° C. The higher the temperature during tempering, the lower is preferably the duration of the tempering. Tempering temperatures below 500° C. lead to particularly reactive material, however higher tempering temperatures are possible and may be expedient depending on the starting material. The tempering temperature and duration should be selected so as to be so high that as much starting material as possible is converted. On the other hand, the temperature should be as low as possible, since the reactivity of the product is higher and this also restricts the necessary energy and thereby the cost and the environmental impact.

After cooling, a product is obtained that comprises at least one calcium silicate $C_2S$, at least one calcium aluminate and at least one X-ray amorphous phase. Usually, the product contains the following components:

1-95% by weight reactive calcium aluminates, preferably in the form of crystalline $C_{12}A_7$, or ill crystalline or amorphous aluminate phases 1-80% by weight magnesium (calcium, aluminium, iron) silicates, in the form of crystalline, ill crystalline or amorphous phases, which may contain foreign ions such as Fe, Al and Ca 1-80% by weight $C_2S$ polymorphs, in the form of crystalline, ill crystalline or amorphous phases 1-80% by weight calcium aluminate silicates, in the form of crystalline, ill crystalline or amorphous phases 1-80% by weight calcium magnesium aluminate silicates, in the form of crystalline, ill crystalline or amorphous phases up to 30% by weight traces and minor components, in particular $C_5A_3$, CA, calcium oxide, $\gamma$ alumina and other aluminas, quartz and/or limestone, CaO, calcium sulphate, $MgCO_3$, $Mg(OH)_2$, $Fe_3O_4$, iron silicates such as $Fe_2SiO_4$, amorphous iron-containing phases and 0-30% by weight hydrates from the hydrothermal treatment, wherein all amounts of the product sum up to 100% and the sum of calcium silicates, calcium aluminates, calcium aluminium silicates, magnesium (calcium, aluminium, iron) silicates and calcium magnesium silicates is at least 30% by weight, preferably at least 50% by weight and most preferred at least 70% by weight.

Provided that the fineness of the product is already sufficient (use of fine raw materials with suitable particle size distribution), the product is already the desired hydraulic reactive binder or a component thereof. If the fineness is insufficient or a binder with particularly high fineness is desired, the product can be ground in a manner known per se, with or without additions, to the desired fineness or particle distribution, respectively. A suitable fineness is, for example, from 2000 to 10,000 cm$^2$/g (Blaine).

Besides the product according to the invention, the binder can additionally contain one or more further constituents selected from Portland cement, fly ash, metakaolin, granulated blast furnace slag and limestone. These constituents can be added in the desired fineness or can be ground together with the product according to the invention.

The BET surface of the binder should range from 1 to 30 m$^2$/g. The water content in the binder is generally at most 20% by weight, preferably less than 15% by weight, and in particular less than 10% by weight.

As a result of the method according to the invention hydraulically highly reactive binders based on $C_2S$, $C_{12}A_7$, magnesium silicates and amorphous phases can be produced. These are characterised in that highly reactive polymorphs of $C_2S$, highly reactive magnesium (calcium, aluminium, iron) silicates, $C_{12}A_7$ and X-ray amorphous as well as ill crystalline phases are contained.

Furthermore, the binder may also contain $\gamma$-$Ca_2SiO_4$. The formation of this polymorph is avoided in the case of Portland cement production by rapid clinker cooling, since this polymorph is considered not make any contribution to strength development hitherto. It has surprisingly been found that this phase, produced by the method according to the invention at a temperature <500° C., demonstrates good reactivity in contrast to the prior production methods.

In contrast to DE 10 2009 018 632, DE 10 2007 035 257, DE 10 2007 035 258 and DE 10 2007 035 259, there is no reaction grinding, since this step is energy intensive and products produced in this way have a lower reactivity than the products produced with the method described here from raw materials having a different composition.

In contrast to prior proposals with a use of raw materials containing aluminium, the temperature during tempering is restricted to below 600° C., preferably to below 550° C. and in particular to below 500° C., so that very reactive polymorphs of Mg-containing, $C_2S$ and other phases and an X-ray amorphous phase are obtained. Thereby a very high reactivity and a particularly fast hydration and strength development based on the formed calcium and magnesium silicate hydrates is achieved.

The invention will be explained with reference to the following examples, but without restricting the scope to the specific embodiments described. If not otherwise specified or if not absolutely otherwise clear from the context, any amount in % is by weight, and in the case of doubt referring to the total weight of the mixture.

The invention further includes all combinations of preferred embodiments that do not exclude each other. A characterisation as "approximately" or "around" in relation to a numerical value means that at least up to 10% higher or lower values or up to 5% higher or lower values, and in any case up to 1% higher or lower values are included.

EXAMPLE 1

Starting material mixtures, one containing 37.8% Portlandite, 29% brucite and 32.6% silica fume and, for comparison, a second one containing 63.7% CaO and 36.3% silica fume were produced from the raw materials listed in Table 1.

TABLE 1

| Raw material | Portlandite | CaO | Brucite | Silica fume |
|---|---|---|---|---|
| Loss on ignition at 1050° C. | 24.33 | | 31.04 | 2.73% |
| $SiO_2$ | | | | 94.05% |
| $Al_2O_3$ | | | | 0.61% |
| $TiO_2$ | | | | 0 |
| MnO | | | | 0 |
| $Fe_2O_3$ | | | | 0.40% |
| CaO | 75.67% | 100% | | 0.31% |
| MgO | | | 68.96% | 0.59% |
| $K_2O$ | | | | 1.12% |
| $Na_2O$ | | | | 0.21% |
| $SO_3$ | | | | 0 |
| $P_2O_5$ | | | | 0.04% |

Figure 1:
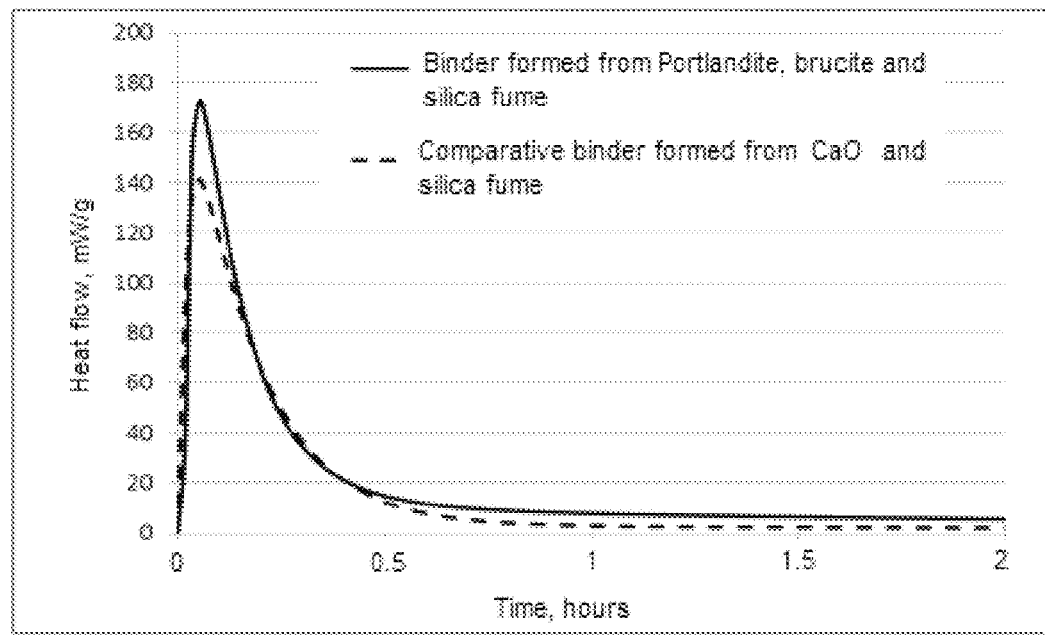
FIG. 1 shows the measured heat flow of the products from Example 1 reacted with a water/solids ratio of 0.5 in a calorimeter.
Figure 2:
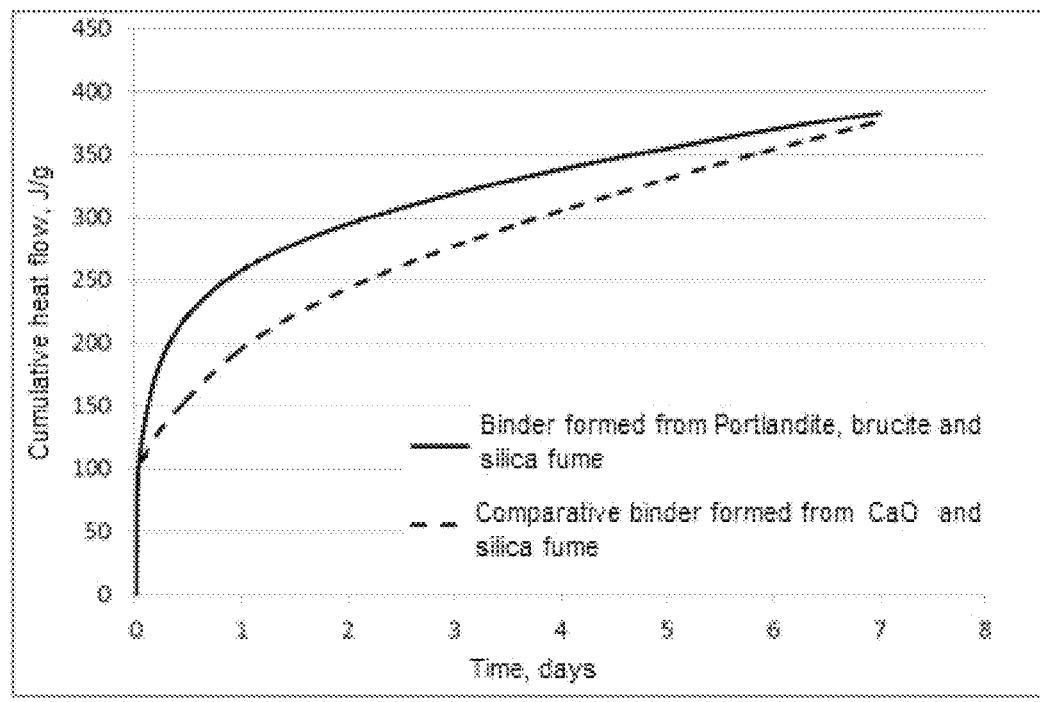
FIG. 2 shows the cumulative heat flow of the products from Example 1.

The two starting material mixtures were each mixed with water at a water/solids ratio of 10, and were treated for 16 hours at 185° C. in an autoclave. The intermediate products were tempered for 1 hour at 500° C. The obtained products were reacted in a calorimeter to check the hydraulic reactivity with a water/solids ratio of 0.5. The obtained heat flows and cumulative heat flows are shown in FIGS. 1 and 2. It can be seen that the product according to the invention with the magnesium content comprises more reactive constituents.

EXAMPLE 2

Figure 3:
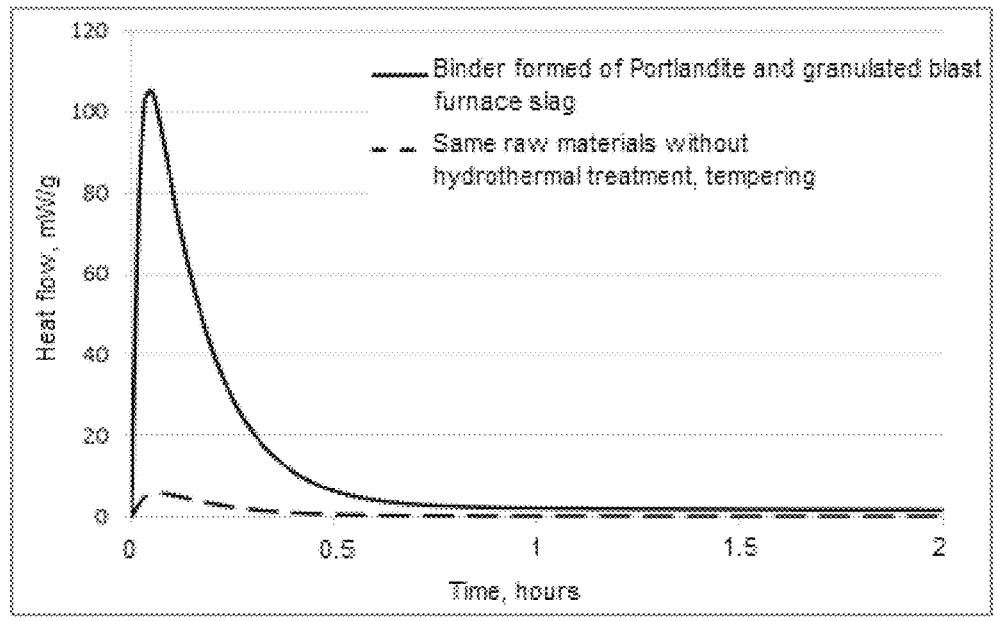
FIG. 3 shows the measured heat flow of the products from Example 2 reacted with a water/solids ratio of 0.5 in a calorimeter.
Figure 4:
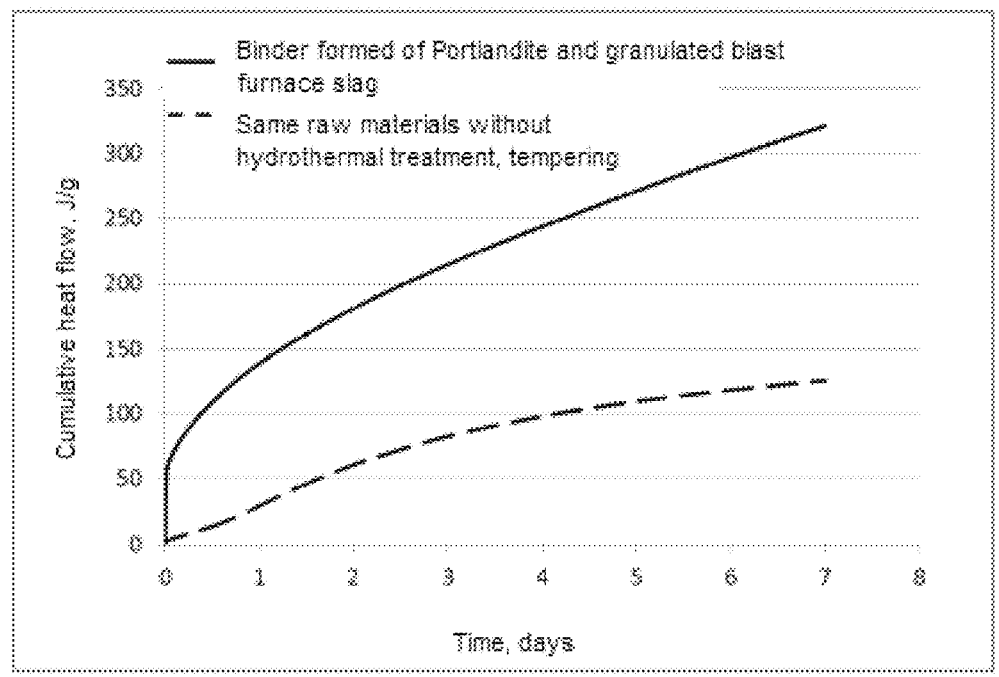
FIG. 4 shows the cumulative heat flow of the products from Example 2.

A starting material mixture containing 27.75% Portlandite and 72.24% granulated blast furnace slag was produced from the raw materials listed in Table 2 and was reacted in accordance with Example 1 to form a binder. The product was reacted in a calorimeter to check the hydraulic reactivity with a water/solids ratio of 0.5. For comparison, the same materials were additionally reacted in a calorimeter with a water/solids ratio of 0.5 without the hydrothermal treatment and tempering. The measured heat flows and cumulative heat flows are shown in FIGS. 3 and 4.

TABLE 2

| Raw material | Portlandite | Granulated blast furnace slag |
|---|---|---|
| Loss on ignition at 1050° C. | 24.33 | 1.37% |
| $SiO_2$ | | 35.84% |
| $Al_2O_3$ | | 11.06% |
| $TiO_2$ | | 0.99% |
| MnO | | 0.34% |
| $Fe_2O_3$ | | 0.44% |
| CaO | 75.67% | 38.99% |
| MgO | | 8.19% |
| $K_2O$ | | 0.49% |
| $Na_2O$ | | 0.15% |
| $SO_3$ | | 3.18% |
| $P_2O_5$ | | 0.00% |
| Amorphous phases | | 92.6% |

It is clear from the examples that the method according to the invention leads to products with high reactivity that can be used as binders, either per se or mixed with further substances. Compared with the production of Portland cement, the energy use is reduced, in part very significantly reduced. In addition, by-products and waste products can be used to an even greater extent.

The invention claimed is:
1. A method for producing a binder comprising the following steps:
   a) providing a starting material from one or more raw materials that contain CaO, MgO, $SiO_2$, $Al_2O_3$ and $Fe_2O_3$ or other compounds of these elements, wherein the starting material has a molar (Ca+Mg)/(Si+Al+Fe) ratio from 1 to 3.5, a molar Ca/Mg ratio from 0.1 to 100, and a molar Al/Si ratio from 100 to 0.1, wherein constituents that are inert during a hydrothermal treatment in an autoclave are not taken into account for determination of the ratios,
   b) mixing the raw materials to form a starting material mixture,
   c) hydrothermal treating of the starting material mixture produced in step b) in an autoclave at a temperature from 100 to 300° C. and a residence time from 0.1 to

24 h, wherein the water/solids ratio is 0.1 to 100, to provide an intermediate product, and d) tempering the intermediate product obtained in step c) at 350 to 600° C., wherein the heating rate is 10-6000° C./min and the residence time is 0.01-600 min.

2. The method according to claim 1, wherein 0.1 to 30% by weight additional elements and/or oxides are added during the mixing b) and/or in the following steps.

3. The method according to claim 1, wherein the raw materials are selected from CaO, Ca(OH)$_2$, Ca and Mg (hydroxide)carbonate(hydrates), MgO, Mg(OH)$_2$, slags, granulated blast furnace slags, ashes, Portland cement clinkers, Portland cement, processed hardened cement pastes, calcium sulfoaluminate belite cement, calcium aluminate cement, glass powder, sodium silicate and natural stone dusts in suitable mixture.

4. The method according to claim 1, wherein an additional burning process at temperatures from 350 to 1400° is performed between the mixing of the starting materials b) and the hydrothermal treatment c).

5. The method according to claim 1, wherein a holding time of 1-120 min during heating at a temperature of 350-600° C. is performed for dewatering in step d).

6. The method according to claim 2, wherein sodium, potassium, boron, sulphur, chlorine, nitrogen, carbon or phosphorous or combinations thereof are used as additional elements.

7. The method according to claim 2, wherein alkaline and/or alkaline earth salts and/or hydroxides are used as a source for the additional elements and/or oxides.

8. The method according to claim 7, wherein the alkaline and/or alkaline earth salts and/or hydroxides are selected from the group consisting of $CaSO_4.2H_2O$, $CaSO_4.\frac{1}{2} H_2O$, $CaSO_4$, $CaHPO_2.2H_2O$, $Ca_3P_2O_8$, NaOH, KOH, $Na_2CO_3$, $NaHCO_3$, $K_2CO_3$, $MgCO_3$, $MgSO_4$, $Na_2Al_2O_4$, $Na_3PO_4$, $K_3PO_4$, $Na_2[B_4O_5(OH)_4].8H_2O$, $CaCl_2$, $Ca(NO_3)_2$, $MgCl_2$, $Mg(NO_3)_2$, $AlCl_3$, $Al(NO_3)_3$, $FeCl_3$, $Fe(NO_3)_3$ $Ca(CH_3COO)_2$, $Mg(CH_3COO)_2$, $Al(CH_3COO)_3$, $Ca(HCOO)_2$, $Mg(HCOO)_2$, $Al(HCOO)_3$, and mixtures thereof.

9. The method according to claim 1, wherein, before the hydrothermal treatment c), from 0.01 to 30% by weight seeds containing calcium silicate hydrates, Portland clinker, granulated blast furnace slag, magnesium silicates, calcium sulphate aluminate (belite) cement, sodium silicate and/or glass powder are added to the mixture.

10. The method according to claim 4, wherein the additional burning process is performed at a temperature from 750 to 1100° C.

11. The method according to claim 2, wherein sodium, potassium, boron, sulphur, chlorine, nitrogen, carbon, or phosphorous, or combinations thereof are used as additional elements.

12. The method according to claim 2, wherein a holding time of 1-120 min during heating at a temperature of 350-600° C. is performed for dewatering in step d).

13. The method according to claim 11, wherein a holding time of 1-120 min during heating at a temperature of 350-600° C. is performed for dewatering in step d).

14. The method according to claim 1, wherein the molar ratio of Ca/Mg is from 0.1 to 5 and the molar ratio (Ca+Mg)/(Si+Al+Fe) is from 1.5 to 3.5.

15. The method according to claim 14, wherein 0.1 to 30% by weight additional elements and/or oxides are added during the mixing b) and/or in the following steps.

16. The method according to claim 15, wherein sodium, potassium, boron, sulphur, chlorine, nitrogen, carbon, or phosphorous or combinations thereof are used as additional elements.

17. The method according to claim 14, wherein a holding time of 1-120 min during heating at a temperature of 350-600° C. is performed for dewatering in step d).

18. The method according to claim 16, wherein a holding time of 1-120 min during heating at a temperature of 350-600° C. is performed for dewatering in step d).

19. A binder obtained by a method according to claim 1.

20. The binder according to claim 19, wherein the binder comprises the following components:
1-95% by weight reactive calcium aluminates,
1-80% by weight magnesium (calcium, aluminium, iron) silicates, in the form of crystalline, ill crystalline or amorphous phases, which may contain foreign ions,
1-80% by weight $C_2S$ polymorphs, in the form of crystalline, ill crystalline or amorphous phases,
1-80% by weight calcium aluminate silicates, in the form of crystalline, ill crystalline or amorphous phases,
1-80% by weight calcium magnesium aluminate silicates, in the form of crystalline, ill crystalline or amorphous phases,
up to 30% by weight traces and minor components, and
0-30% by weight hydrates from the hydrothermal treatment.

21. A binder obtained by a method according to claim 14.

22. The binder according to claim 21, wherein the binder comprises at least one calcium silicate, calcium aluminate, calcium aluminium silicate, magnesium (calcium, aluminium, iron) silicate or calcium magnesium silicate and at least one X-ray amorphous phase, wherein the sum of calcium silicates, calcium aluminates, calcium aluminium silicates, magnesium (calcium, aluminium, iron) silicates and calcium magnesium silicates is at least 30% by weight.

23. The binder according to claim 22, wherein the binder comprises the following components:
1-95% by weight reactive calcium aluminates,
1-80% by weight magnesium (calcium, aluminium, iron) silicates, in the form of crystalline, ill crystalline or amorphous phases, which may contain foreign ions,
1-80% by weight $C_2S$ polymorphs, in the form of crystalline, ill crystalline or amorphous phases,
1-80% by weight calcium aluminate silicates, in the form of crystalline, ill crystalline or amorphous phases,
1-80% by weight calcium magnesium aluminate silicates, in the form of crystalline, ill crystalline or amorphous phases,
up to 30% by weight traces and minor components, and
0-30% by weight hydrates from the hydrothermal treatment.

24. The binder according to claim 21, wherein the BET surface area of the binder ranges from 1 to 30 $m^2/g$.

25. The binder according to claim 21, wherein a chemically bonded water content is at most 20% by weight.

26. A concrete, mortar, or plaster comprising a binder according to claim 21.

27. The binder according to claim 23, wherein the traces and minor components are $C_5A_3$, CA, calcium oxide, aluminas, quartz and/or limestone, CaO, calcium sulphate, $MgCO_3$, $Mg(OH)_2$, FeO, $Fe_2O_3$, $Fe_3O_4$, iron silicates, amorphous iron-containing phases, or mixtures thereof.

28. The binder according to claim 23, wherein the reactive calcium aluminates are in the form of crystalline $C_{12}A_7$, or ill crystalline or amorphous aluminate phases.

29. The binder according to claim 27, wherein a chemically bonded water content is at most 10% by weight.

\* \* \* \* \*